Jan. 31, 1939.                R. S. BUCK                    2,145,233
                       COWL NOSE SECTION RADIATOR
                        Filed Dec. 8, 1936            2 Sheets-Sheet 1
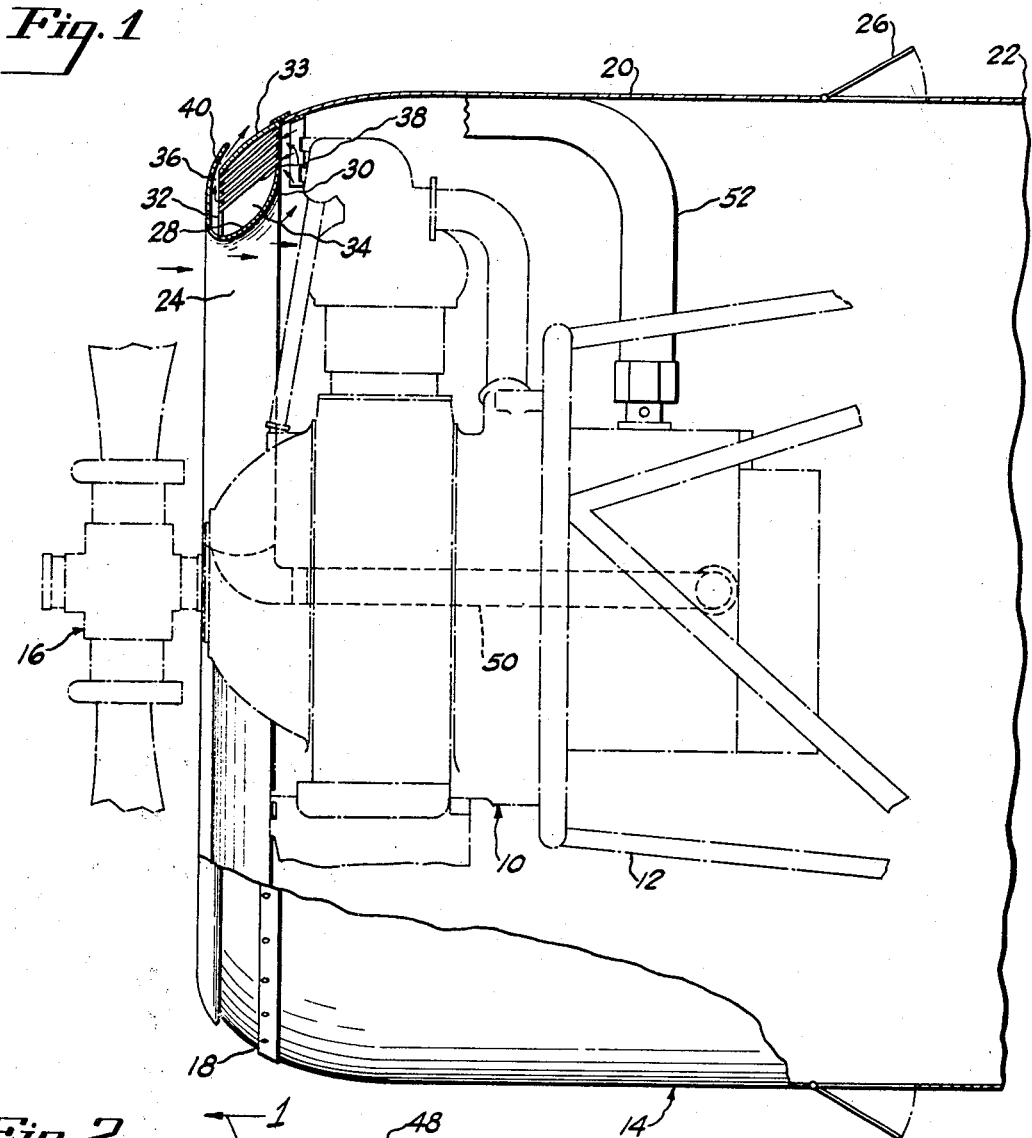
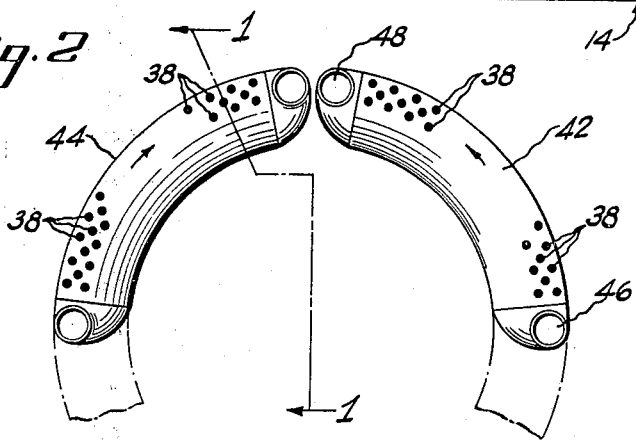
INVENTOR.
Richard S. Buck
BY Harris G. Luther
ATTORNEY

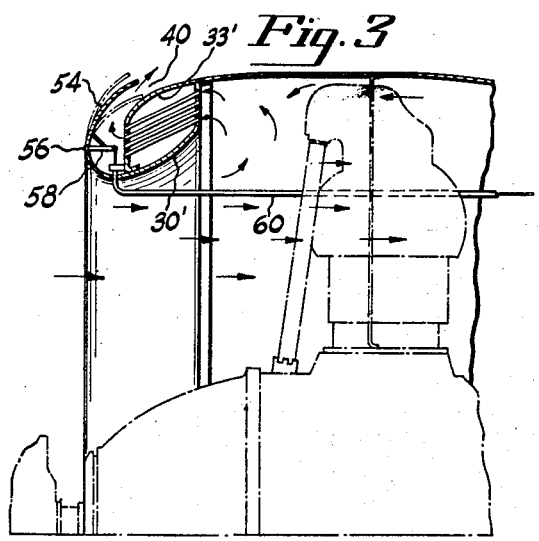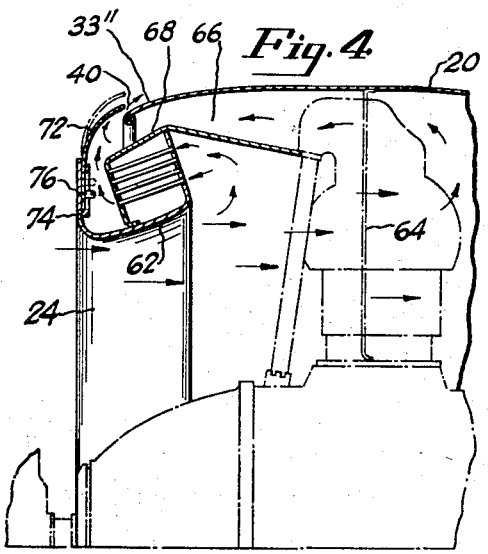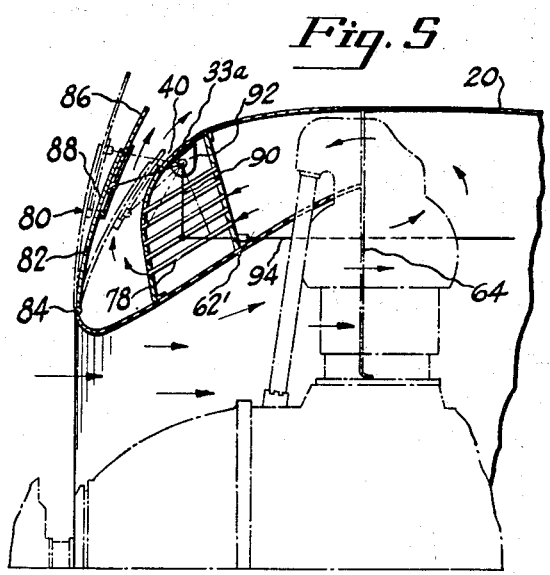

Patented Jan. 31, 1939

2,145,233

UNITED STATES PATENT OFFICE 2,145,233

COWL NOSE SECTION RADIATOR

Richard S. Buck, Wethersfield, Conn., assignor to United Aircraft Corporation, East Hartford, Conn., a corporation of Delaware Application December 8, 1936, Serial No. 114,841

9 Claims. (Cl. 123—171)

This invention relates to improvements in cooling means for vehicle power plants and has particular reference to cooling means used in combination with the power plant for an airplane.

An object of the invention resides in the provision of an improved heat eliminating radiator disposed in such a location that it will receive an adequate quantity of cooling air from the natural flow of the air through and around the power plant.

A further object resides in the provision of improved cooling means located in a portion of the engine enclosure where it will not add to the total drag of the airplane or noticeably clutter the space within the power plant enclosure.

A further object resides in the provision of an improved cooling means of the character set forth located in a position in which it will be subject to an adequate amount of natural airflow from the air stream flowing through and around the power plant and in which the quantity of air flowing through the cooling means may be easily controlled.

Other objects and advantages will be more particularly set forth hereinafter or will become apparent as the description proceeds.

In the accompanying drawings in which like reference numerals are used to designate similar parts throughout, there is illustrated a suitable mechanical embodiment of what is now considered to be the preferred form of the idea of the invention and three slightly modified forms of a suitable controlling means for controlling the air flowing through the improved cooling device. The drawings, however, are for the purpose of illustration only and are not to be taken as limiting the invention, the scope of which is to be measured entirely by the scope of the appended claims.

In the drawings, Figure 1 is a somewhat diagrammatic elevational view of a cowl enclosed power plant such as a radial, internal combustion engine and engine driven propeller, such as is ordinarily employed for the propulsion of airplanes, a portion of the engine cowl being broken away and shown in section to illustrate the application of the device of the invention thereto. The view shown in Figure 1 is taken approximately on the line 1—1 of Figure 2.

Figure 2 is a rear elevational view of the improved heat radiating means illustrated in section in Figure 1.

Figure 3 is a sectional view through the nose portion of an engine cowl showing the application thereto of an improved heat dissipating radiator, constructed according to the idea of this invention, and of suitable controllable means for controlling the flow of air through the radiator.

Figure 4 is a view similar to Figure 3 showing a different form of air control means for the heat dissipating radiator.

Figure 5 is a view similar to Figures 3 and 4 and showing a still further modified form of air control mechanism for the heat dissipating radiator.

Referring to the drawings in detail, the numeral 10 generally indicates a suitable form of vehicle power plant such as an internal combustion engine. For the sake of convenience, a radial air-cooled internal combustion engine such as is ordinarily employed for the propulsion of airplanes has been illustrated but it is to be understood that the invention is in no way limited to any particular form of power plant but may be used with any power plant in combination with which the additional heat dissipating facilities of the radiator would be advantageous.

The engine is mounted upon some portion of the airplane, such as the fuselage or wing, by means of a suitable supporting structure, generally indicated at 12 and is enclosed in a streamlined or drag reducing cowl, generally indicated at 14, and drives an aeronautical propeller, generally indicated at 16.

The cowl illustrated is of a form generally employed for enclosing radial aircraft engines and is provided with an inwardly curved front portion 18, a substantially cylindrical intermediate portion 20 and a rear portion 22 faired into the fuselage or nacelle upon which the engine is mounted.

At its front end the cowl is provided with an annular air entrance opening 24 surrounding the space between the front end of the engine and the hub of the propeller, and is provided adjacent to its rear end with suitable air exit means such as the adjustable flaps 26.

Cowls of the form illustrated in Figure 1 are usually provided with an inwardly curved front portion surrounding a somewhat restricted air entrance aperture 24 and are bent or beaded over, as indicated at 28, to provide an easy entering edge for the engine cooling air flowing through the aperture 24. This construction provides at the front of the engine, within the cowl, an annular space of considerable dimensions which in the usual engine installation is not used for any purpose although some installations have been designed to use such a space for enclosing the exhaust collector ring of the engine. This is usually, however, an inconvenient location for the exhaust collector ring and, as stated above, in the usual installation the space is left entirely empty.

It is a well-known fact that a region of high velocity low pressure air exists over the inwardly curved front portion of the cowl ordinarily designated as the cowl nose, the pressure of the external atmosphere over this portion of the cowl being materially less than the atmospheric pressure within the cowl. It is among the objects of this invention to install a cooling radiator in the normally empty annular space within the cowl nose in such a manner that the difference in the atmospheric pressure within the cowl and in the region immediately adjacent to the exterior of the cowl nose may be utilized to provide a natural stream of air flowing at high velocity through the radiator.

In the practical application of the idea of the invention, the forward or nose portion of the cowl may be formed of two or more annular members separated from the intermediate portion 20 of the cowl by a detachable connection. A suitable cowl arrangement is illustrated in application Serial No. 26,878 of Rex B. Beisel filed June 15, 1935.

In the present application of the invention, the nose portion of the cowl is constituted by three annular members indicated by the numerals 30, 32 and 33. The member 30 is an annular member constructed substantially in the shape of a torus and has an open peripheral portion. The member 33 extends across the major portion of the open peripheral portion of the member 30, and the member 32 extends from the edge of the annular member 33 to the inner portion of the annular member 30 and divides the annular interior of the member 30 into two chambers, indicated at 34 and 36. The annular chamber 34 is completely enclosed by the members 30, 32 and 33, all of which members are welded or securely riveted together along their contacting areas to constitute the chamber 34 a substantially airtight annular chamber. A plurality of thin-walled tubes 38 are secured at their ends in the member 32 and the portion of the member 30 opposite the member 32. These tubes extend through the members 30 and 32 and provide a passage for air from the interior of the cowl adjacent to the inner surface of the member 30 to the chamber 36 from which the air is vented to the low pressure region existing over the cowl nose through the annular air vent slot 40.

From the description so far given it will be observed that the annular chamber 34 and the tubes 38 constitute an annular radiator around the cowl nose, disposed within the empty space ordinarily existing in the cowl nose, and so located that a stream of cooling air will be caused to flow through the radiator tubes 38 by the difference in air pressure within the cowl and in the region adjacent to the external surface of the cowl nose. This annular radiator is preferably divided up into sections as indicated at 42 and 44 in Figure 2 and each section is provided with an inlet opening as indicated at 46 and an outlet opening as indicated at 48.

From this description, it will be observed that any fluid entering the radiator inlet opening 46 flowing through the radiator section and leaving the radiator through the outlet opening 48 will be cooled by the air flowing through the tubes 38 about which the fluid circulates in passing through the radiator section from the inlet to the outlet opening.

Obviously the cooling effect of the radiator sections 42 and 44 may be utilized for various purposes such as cooling lubricating oil, or cooling the liquid of a liquid cooled engine, or cooling the air supplied to an internal combustion engine as a part of the combustible mixture, and the total amount of cooling may be changed by changing the size and number of the sections. Such sections may occupy the entire annular chamber 34 or may occupy, in the aggregate, only a small portion of this chamber depending upon the amount of cooling desired.

As an exemplification of the general utility of the device, it has been illustrated in connection with a two stage supercharged engine, that is an engine in which the air supplied to the carburetor to provide a combustible mixture for operating the engine is first compressed by one power driven blower in the first stage and is delivered from this blower to a second blower for further compression in the second stage. It has been found essential in all such installations to provide means between the two blowers or stages for cooling the air as it is delivered from the first to the second stage since, if the heat added to the air by the energy used to drive the first blower is not dissipated the operation of the engine will be adversely affected. The heat dissipating means ordinarily disposed between the first and second supercharger stages is ordinarily designated an intercooler and it is believed entirely obvious that the radiator construction illustrated in the accompanying drawings and described above provides a convenient and efficient intercooler for reducing the temperature of the carburetor intake air.

In this construction a tubular conduit 50 leads from the first stage of the supercharger to the inlet opening 46, and from the outlet opening 48 a second tubular conduit 52 leads to the second stage of the supercharger. Thus the air supplied to the carburetor is first compressed by the first supercharger stage, is forced through the radiator sections 42 and 44 to reduce the temperature thereof, and is returned to the second supercharger stage in a cooled condition and from the second supercharger stage is supplied to the engine carburetor.

As explained above, the cooling air flows from the interior of the cowl 20 through the radiator tubes 38 into the annular chamber 36 from which it is vented to the exterior of the cowl through the annular vent opening 40, disposed adjacent to the front end of the cowl nose and in a region of low air pressure existing over the nose of the cowl. A convenient means of controlling the cooling effect of the radiator is by controlling the size of the air vent opening since this method of control will also have an advantageous effect in reducing the drag of the cowl and the cowl drag can always be kept at a minimum consistent with adequate cooling of the engine intake air or other medium which the annular radiator is utilized to cool.

Three exemplary methods of controlling the size of the air vent opening 40 are illustrated in Figures 3, 4 and 5.

In Figure 3, the forward and outer portions 54 of the annular member 30' corresponding to the annular member 30 in Figure 1 is provided with movable sections pivotally secured to the fixed portion of the member by suitable hinge joints, as indicated at 56, so that the sections may be swung about the hinge joints to move their peripheral edges toward or away from the adjacent surface of the forward portion of the member 33' corresponding to the member 33 in Figure 1. The movable sections of the member 54 are actuated by suitable means such as the levers 58 extending inwardly from the hinge joints 56 and connected at their free ends with a suitable operating mechanism such as the Bowden wire or Ahrens cable 60, the opposite end of which may be either attached to an automatic temperature control device or to a manually operable lever placed within reach of the operator of the vehicle.

In the form of the invention illustrated in Figure 4, the member 62 which corresponds to the member 30 of Figure 1 constitutes the inner and rearward walls of the radiator. An annular member 63 extends from the top of the radiator rearwardly to the engine baffle system 64 so that some of the air entering the air inlet opening 24 is immediately diverted through the radiator, the remainder flowing through the baffle system 64 between the engine cylinders and a portion returning through the annular space 66 provided between the member 63 and the cowl 20 to the radiator air vent.

In this form of the invention the member 63 constitutes the outer and forward walls of the radiator.

With this form of construction the air flowing through the radiator and the annular space between the radiator and the cowl is controlled by controlling the size of the air outlet vent. In this form of the invention, the control means take the form of radially slidable sections 72, mounted in suitable guideways 74 provided on the forward radially disposed end of the member 62. The slidable members 72 are connected by means of the lug 76 with a suitable manual or automatic operating means, not illustrated.

In the form of the invention illustrated in Figure 5, the member 62' may, if desired, be extended rearwardly to the baffle system 64 so that air will flow between this member and the cowl 20 after flowing past the heat radiating surfaces of the engine. Alternatively, if desired, the member 62' may be terminated at the rear side of the radiator 78.

In this form of the invention the means for controlling the size of the annular air vent opening 40 takes the form of a plurality of double members generally indicated at 80 having their inner portions 82 pivotally connected to the forward portion of the member 62' by suitable means such as the hinge joints 84 and an outer slidable portion 86 supported upon the pivotally movable portions 82 by suitable guideways 88. It is obvious that the sections 80 may be swung in forward and rearward directions about the hinge connections 84 and may also when desired be extended in a radial direction by moving the slidable portion 86. Preferably the two above described motions are utilized simultaneously, that is the portions 82 are swung about the hinge joints 84 and the slidable portions 86 are moved radially outward or inward at the same time by suitable operative mechanism presently to be described. By reason of this motion the extent of the vent opening 40 may be greatly varied, the wide open area be greatly in excess of the area possible to provide with the two forms of control means described above.

The operating mechanism illustrated takes the form of a bell crank lever 90 hinged at the adjoining portions of an angularly disposed leg to a fixed lug member 92 carried upon the interior of the cowl member 33a. This bell crank member 90 has the free end of one of its legs connected to the corresponding slidable member 86 of the respective movable member 80 and has its other leg connected at its free end to a suitable automatically or manually actuated control device 94. In order to avoid unnecessary complications, the bell crank lever 90 in the form of the invention illustrated in Figure 5 is preferably disposed between adjacent sections of the annular radiator. From an inspection of Figure 5, it will be observed that when the bell crank lever is moved about its pivotal connection with the lug 92 the slidable portion 86 will be moved inwardly or outwardly and at the same time the rotatable portion 82 of the control members 80 will be swung about the hinge joints 84 to change the area of the air vent opening 40.

It will be apparent from the above description and the illustration contained in Figures 3, 4 and 5 that with any one of the control means illustrated the additional drag caused by the radiator will be reduced substantially to zero when the vent opening control means are closed and that, when the vent opening control means are moved to fully open the vent opening, a large amount of cooling air will be drawn to the radiators to provide an effective cooling of the fluid medium flowing through the interior of the radiator.

While there has been illustrated and described a suitable mechanical embodiment of what is now considered to be the preferred form of the idea of the invention and three somewhat modified forms of a suitable control means therefor, it is to be understood that the invention is not limited to the particular arrangement so illustrated and described but that such changes in the size, shape and arrangement of parts may be resorted to as come within the scope of the subjoined claims.

Having now described the invention so that others skilled in the art may clearly understand the same what it is desired to secure by Letters Patent is as follows.

What is claimed is:

1. In combination with a radial engine and an annular cowl therefor, said cowl having a front opening for the entrance of engine cooling air and a curved front portion surrounding said opening constituting an annular chamber within said cowl, tubes extending through opposite walls of said chamber to provide a heat dissipating radiator within the forward end of said cowl, said tubes opening at one end into the interior of said cowl and at the other end to the exterior, an annular air exit slot in the curved forward portion of said cowl for venting the air flowing through said tubes from the interior of the cowl, and an inlet and an outlet connected with said chamber to conduct fluid to be cooled to and from said chamber.

2. In combination with a radial engine and an annular cowl therefor, said cowl having a front entrance opening for the entrance of engine cooling air and a curved front portion surrounding said opening providing an annular chamber within said cowl, tubes extending through opposite walls of said chamber to provide a heat dissipating radiator within the forward portion of said cowl, said tubes opening at one end to the interior of said cowl and at the other end into an annular chamber between said radiator and an adjacent portion of said cowl, an annular rearwardly directed air vent slot in the forward portion of said cowl leading from the annular chamber into which said radiator tubes open and located in the region of low air pressure over the cowl nose, and fluid conduits connected with said chamber to conduct fluid to be cooled to and from said chamber.

3. In combination with a radial engine and an annular cowl therefor, said cowl having a forward opening for the entrance of engine cooling air and a curved portion surrounding said opening providing an annular chamber within said cowl, tubes extending through the opposite walls of said annular chamber to provide a heat dissipating radiator in the forward end of the cowl, said tubes opening at one end into the interior of the cowl and at the other end into an annular chamber between the radiator and an adjacent portion of the cowl, an annular air vent slot in the forward portion of said cowl leading from the annular chamber into which said tubes open to the exterior of the cowl in the region of low air pressure over the cowl nose, and means for regulating the size of said air vent opening, and fluid conduits connected with said chamber to conduct fluid to be cooled to and from said radiator.

4. In combination with a radial engine and an annular cowl therefor, said cowl having a front opening for the entrance of engine cooling air and a curved forward portion surrounding said opening and providing an annular chamber within the forward portion of said cowl, tubes extending through the opposite walls of said annular chamber to provide a heat dissipating radiator within the forward portion of said cowl, said tubes opening at one end into the interior of said cowl and at the other end into an annular chamber between said radiator and the extreme forward portion of said cowl, an annular air vent slot in said cowl leading from said annular chamber into which said tubes open to the exterior of said cowl in the region of low air pressure over the cowl nose, means for regulating the size of said air vent opening comprising movable sections in the forward portion of said cowl, and fluid conduits connected with said chamber to conduct fluid to be cooled to and from said radiator.

5. In combination with a radial engine and an annular cowl therefor, said cowl having a front opening for the entrance of engine cooling air and a curved forward portion surrounding said opening and providing an annular chamber within the forward portion of said cowl, tubes extending through the opposite walls of said annular chamber to provide a heat dissipating radiator within the forward portion of said cowl, said tubes opening at one end to the interior of said cowl and at the other end into an annular chamber between said radiator and the extreme forward portion of said cowl, an annular air vent slot in said cowl leading from the annular chamber into which said tubes open to the exterior of said cowl in the region of low air pressure over the cowl nose, means for regulating the size of said air vent slot comprising movable sections hinged to the forward portion of the cowl, means for moving said sections about said hinge connection to vary said air vent opening, and fluid conduits connected to said chamber on opposite sides of a discontinuity therein to conduct fluid to be cooled to and from said radiator.

6. In combination with a radial engine and an annular cowl therefor, said cowl having a front opening for the entrance of engine cooling air and a curved forward portion surrounding said opening providing an annular chamber within the forward portion of said cowl, tubes extending through the opposite walls of said chamber to provide a heat dissipating radiator within the forward portion of the cowl, said tubes opening at one end into the interior of said cowl and at the other end into an annular chamber between said radiator and the extreme forward portion of the cowl, an air vent slot in said cowl leading from the annular chamber into which said tubes open to the exterior of said cowl in the region of low air pressure over the cowl nose, and means for regulating the size of said air vent slot comprising movable sections slidably mounted on the fixed forward portion of the cowl, means for sliding said section relative to the fixed portion of the cowl to vary the size of said air vent opening, and fluid conduits connected with said chamber to conduct fluid to be cooled to and from said radiator.

7. In combination with a radial engine and an annular drag reducing cowl therefor, said cowl having a front opening for the entrance of engine cooling air and a curved forward portion surrounding said opening to provide within the forward portion of said cowl an annular chamber, tubes extending through the opposite walls of said annular chamber to provide a heat dissipating radiator within the forward portion of said cowl, said tubes opening at one end into the interior of said cowl and at the other end into an annular chamber between said radiator and the extreme forward portion of said cowl, and an annular air vent slot leading from said annular chamber into which said tubes open to the exterior of said cowl in the region of low air pressure over the cowl nose, and means for regulating the size of said annular air vent opening comprising movable sections in the forward portion of said cowl, each section comprising a portion mounted for annular movement on the fixed part of the cowl nose and a portion slidably mounted on said annularly movable portion, and means for imparting a combined annular and sliding movement to said section to vary the size of said annular air vent opening, and fluid conduits connected with said chamber for conducting fluid to be cooled to and from said radiator.

8. In combination with an annular engine cowl having an inwardly curved forward portion to provide a region of low air pressure over the cowl nose, a radiator in the forward portion of said cowl having exterior walls and a plurality of passages between said walls forming a connection between the interior of the cowl and the front of the cowl nose, and means providing a variable air vent opening in the forward portion of the cowl within said low air pressure region connected with the exit ends of said tubes, to provide a stream of cooling air flowing at high velocity from the interior of said cowl to the exterior thereof through said radiator and said vent opening, and a fluid inlet and outlet for said radiator.

9. In combination a cowl surrounding an engine cooling means and having an air entrance portion, a radiator in the forward portion of said cowl for cooling a substance circulated therethrough, said cowl being provided with an air exit opening in the forward portion of said cowl, means defining two paths for the air from said air entrance portion to said air exit portion said means comprising means defining two passages leading from said air entrance portion, one passage leading through said engine cooling means and the other passage leading through said radiator, and means maintaining air passing through said engine separate from air passing through said radiator to a point adjacent the exit in the forward portion of said cowl.

RICHARD S. BUCK.